United States Patent
Chrapko et al.

(10) Patent No.: US 10,079,732 B2
(45) Date of Patent: Sep. 18, 2018

(54) CALCULATING TRUST SCORES BASED ON SOCIAL GRAPH STATISTICS

(71) Applicant: www.TrustScience.com Inc., Edmonton (CA)

(72) Inventors: Evan V Chrapko, Edmonton (CA); Leo M. Chan, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 35 days.

(21) Appl. No.: 14/990,348

(22) Filed: Jan. 7, 2016

(65) Prior Publication Data

US 2016/0197788 A1    Jul. 7, 2016

Related U.S. Application Data

(63) Continuation of application No. 13/582,387, filed as application No. PCT/CA2011/050125 on Mar. 3, 2011, now Pat. No. 9,264,329.

(Continued)

(51) Int. Cl.
*G06F 15/16* (2006.01)
*H04L 12/24* (2006.01)
(Continued)

(52) U.S. Cl.
CPC .......... *H04L 41/12* (2013.01); *H04L 43/0811* (2013.01); *H04L 45/00* (2013.01); *H04W 28/08* (2013.01)

(58) Field of Classification Search
CPC ..... H04L 12/26; H04L 41/12; H04L 43/0811; H04L 45/00; H04L 41/5038; H04L 43/10;
(Continued)

(56) References Cited

U.S. PATENT DOCUMENTS 6,108,308 A    8/2000 Flavin et al.
6,356,902 B1    3/2002 Tan et al.
(Continued)

FOREIGN PATENT DOCUMENTS

CA    2600344 A1    9/2006
CA    2775899 A1    4/2011
(Continued)

OTHER PUBLICATIONS

Geisberger et al., "Contraction Hierarchies: Faster and Simpler Hierarchical Routing in Road Networks," LNCS 5038:319-333 (2008).

(Continued)

*Primary Examiner* — Zarni Maung
(74) *Attorney, Agent, or Firm* — Amin, Turocy & Watson, LLP

(57) ABSTRACT

Systems and methods for calculating trust scores (trustworthiness) based on social graph statistics are described herein. The trust scores (trustworthiness) may be determined within or between individuals, groups, and/or entities represented by nodes in a social graph or other network. Social graph analytics may be used to determine connectivity statistics for each node in the social graph or network. The trust score may then be calculated by analyzing a number of paths connecting nodes in the network and the connectivity statistics associated with the nodes of the network. This trust score may then be used to make prospective real-world decisions, such as a request for credit or initiating a transaction.

20 Claims, 11 Drawing Sheets

Related U.S. Application Data

(60) Provisional application No. 61/310,844, filed on Mar. 5, 2010.

(51) Int. Cl.
*H04L 12/701* (2013.01)
*H04L 12/26* (2006.01)
*G06F 12/00* (2006.01)
*H04W 28/08* (2009.01)

(58) Field of Classification Search
CPC ....... H04L 43/16; H04L 43/50; H04L 41/145; H04L 41/22; H04L 43/08; H04L 43/0876; H04L 63/0823; H04W 28/08
USPC .......................................... 709/223–229, 250
See application file for complete search history.

(56) References Cited

U.S. PATENT DOCUMENTS

| | | |
|---|---|---|
| 6,446,048 B1 | 9/2002 | Wells et al. |
| 6,509,898 B2 | 1/2003 | Chi et al. |
| 6,633,886 B1 | 10/2003 | Chong |
| 6,708,308 B2 | 3/2004 | De Souza et al. |
| 6,738,777 B2 | 5/2004 | Bliss et al. |
| 6,823,299 B1 | 11/2004 | Contreras et al. |
| 7,086,085 B1 | 8/2006 | Brown et al. |
| 7,130,262 B1 | 10/2006 | Cortez et al. |
| 7,130,908 B1 | 10/2006 | Pecus et al. |
| 7,266,649 B2 | 9/2007 | Yoshida et al. |
| 7,451,365 B2 | 11/2008 | Wang et al. |
| 7,512,612 B1 | 3/2009 | Akella et al. |
| 7,539,697 B1 | 5/2009 | Akella et al. |
| 7,664,802 B2 | 2/2010 | Aaltonen et al. |
| 7,668,665 B2 | 2/2010 | Kim |
| 7,685,192 B1 | 3/2010 | Scofield et al. |
| 7,743,208 B2 | 6/2010 | Yoshida et al. |
| 7,822,631 B1 | 10/2010 | Vander Mey et al. |
| 8,010,458 B2 | 8/2011 | Galbreath et al. |
| 8,108,536 B1 | 1/2012 | Hernacki et al. |
| 8,156,558 B2 | 4/2012 | Goldfeder et al. |
| 8,180,804 B1 | 5/2012 | Narayanan et al. |
| 8,214,883 B2 | 7/2012 | Obasanjo et al. |
| 8,234,346 B2* | 7/2012 | Rao .................. G06Q 30/08 709/203 |
| 8,261,078 B2 | 9/2012 | Barriga et al. |
| 8,301,617 B2 | 10/2012 | Muntz et al. |
| 8,316,056 B2 | 11/2012 | Wable |
| 8,392,590 B2 | 3/2013 | Bouchard et al. |
| 8,468,103 B2 | 6/2013 | Galbreath et al. |
| 8,516,196 B2 | 8/2013 | Jain et al. |
| 8,572,129 B1 | 10/2013 | Lee et al. |
| 8,601,025 B1 | 12/2013 | Shajenko et al. |
| 8,682,837 B2 | 3/2014 | Skelton |
| 8,683,423 B2 | 3/2014 | Amaral et al. |
| 9,264,329 B2* | 2/2016 | Chrapko ............. H04L 41/12 |
| 9,443,004 B2* | 9/2016 | Chan .................. G06F 17/3064 |
| 9,460,475 B2* | 10/2016 | Chrapko ............. G06Q 30/02 |
| 2003/0037168 A1* | 2/2003 | Brabson ............. H04L 45/04 709/249 |
| 2003/0133411 A1 | 7/2003 | Ise et al. |
| 2003/0227924 A1 | 12/2003 | Kodialam et al. |
| 2004/0018518 A1 | 1/2004 | Krieb et al. |
| 2004/0088147 A1 | 5/2004 | Wang et al. |
| 2004/0122803 A1 | 6/2004 | Dom et al. |
| 2004/0181461 A1 | 9/2004 | Raiyani et al. |
| 2004/0239674 A1 | 12/2004 | Ewald et al. |
| 2005/0096987 A1 | 5/2005 | Miyauchi |
| 2005/0243736 A1 | 11/2005 | Faloutsos et al. |
| 2006/0271564 A1 | 11/2006 | Meng Muntz et al. |
| 2006/0287842 A1 | 12/2006 | Kim |
| 2006/0290697 A1 | 12/2006 | Madden et al. |
| 2007/0109302 A1 | 5/2007 | Tsuboshita et al. |
| 2007/0214259 A1 | 9/2007 | Ahmed et al. |
| 2007/0220146 A1 | 9/2007 | Suzuki |
| 2007/0282886 A1 | 12/2007 | Purang et al. |
| 2008/0015916 A1 | 1/2008 | Cossey et al. |
| 2008/0037562 A1* | 2/2008 | Saleh .................. H04L 12/66 370/400 |
| 2008/0086442 A1 | 4/2008 | Dasdan et al. |
| 2008/0104225 A1 | 5/2008 | Zhang et al. |
| 2008/0133391 A1 | 6/2008 | Kurian et al. |
| 2008/0183378 A1 | 7/2008 | Weidner |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0064293 A1 | 3/2009 | Li et al. |
| 2009/0106822 A1 | 4/2009 | Obasanjo et al. |
| 2009/0198562 A1 | 8/2009 | Wiesinger et al. |
| 2009/0296568 A1 | 12/2009 | Kitada |
| 2010/0004940 A1 | 1/2010 | Choi et al. |
| 2010/0010826 A1 | 1/2010 | Rosenthal et al. |
| 2010/0076987 A1 | 3/2010 | Schreiner |
| 2010/0180048 A1 | 7/2010 | Guo et al. |
| 2010/0274815 A1 | 10/2010 | Vanasco |
| 2010/0309915 A1 | 12/2010 | Pirbhai et al. |
| 2011/0173344 A1 | 7/2011 | Mihaly et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |
| 2011/0295626 A1 | 12/2011 | Chen et al. |
| 2011/0295832 A1* | 12/2011 | Aggarwal .......... G06K 9/00677 707/709 |
| 2012/0182882 A1 | 7/2012 | Chrapko et al. |
| 2012/0282884 A1 | 11/2012 | Sun |
| 2012/0317149 A1 | 12/2012 | Jagota et al. |
| 2012/0317200 A1 | 12/2012 | Chan |
| 2013/0013807 A1 | 1/2013 | Chrapko et al. |
| 2013/0166601 A1 | 6/2013 | Chrapko et al. |
| 2013/0173457 A1 | 7/2013 | Chrapko et al. |
| 2013/0332740 A1 | 12/2013 | Sauve et al. |
| 2014/0089189 A1 | 3/2014 | Vasireddy et al. |
| 2014/0156274 A1 | 6/2014 | You et al. |
| 2014/0172708 A1* | 6/2014 | Chrapko .......... G08G 1/096741 705/44 |
| 2015/0026120 A1 | 1/2015 | Chrapko et al. |

FOREIGN PATENT DOCUMENTS

| | | |
|---|---|---|
| EP | 1511232 A1 | 3/2005 |
| JP | 2001-298453 A | 10/2001 |
| JP | 2003-259070 A | 9/2003 |
| JP | 2006-260099 A | 9/2006 |
| JP | 2008129990 A | 6/2008 |
| WO | WO-2009002193 A1 | 12/2008 |
| WO | WO-2009020964 A2 | 2/2009 |
| WO | WO-2009109009 A1 | 9/2009 |
| WO | WO-2010048172 A1 | 4/2010 |
| WO | WO-2011143761 A1 | 11/2011 |
| WO | WO-2013026095 A1 | 2/2013 |

OTHER PUBLICATIONS

Angwin et al, "'Scrapers' Dig Deep for Data on Web", http://online.wsj.com/article/SB10001424052748703358504575544381288117888.html?mod=djemalertNEWS, Oct, 12, 2010, printed Nov. 6, 2010, 5 pages.

Anthes, "The Search Is on", Non-Obvious Relationship Awareness, http://www.computerworld.com/s/article/70041/The_Search_is_On, Apr. 15, 2002, printed Nov. 6, 2010, 8 pages.

Baras et al., "Dynamic Self-organization and Clustering in Distributed Networked Systems for Performance Improvement", Proceedings of the 47th annual Allerton conference on Communication, Control, and Computing, Allerton'09, Illinois, USA, pp. 968-975, Sep. 30-Oct. 2, 2009 (Sep. 30, 2009).

Chakraborty et al., "TrustBAC-Integrating Trust Relationships into the RBAC Model for Access Control in Open Systems", Proceedings of the eleventh ACM symposium on Access Control Models and Technologies, SACMAT '06, pp. 49-58, Jun. 7-9, 2006 (Jul. 6, 2006).

(56) References Cited

OTHER PUBLICATIONS

Ding et al., "Transitive closure and metric inequality of weighted graphs: detecting protein interaction modules using cliques," Int. J. Data Mining and Bioinformatics, Vo. 1, o. Feb. 2006, pp. 162-177, Sep. 2006.
Feldman et al., "Robust Incentive Techniques for Peer-to-Peer Networks", Proceedings of the fifth ACM Conference on Electronic Commerce EC'04, New York, New York, USA, pp. 102-111, May 17-20, 2004 (May 17, 2004).
Gan et al., "A Novel Reputation Computing Model for Mobile Agent-Based E-Commerce Systems", Proceedings of the International Conference on Information Security and Assurance, ISA 2008, pp. 253-260, Apr. 24-26, 2008 (Apr. 24, 2008).
Golbeck et al., "Inferring Trust Relationships in Web-based Social Networks", Journal of ACM Transactions of Internet Technology (TOIT), vol. 6, issue 4, Nov. 2006 (Nov. 2006).
Gu et al., "Processing Massive Sized Graphs Using Sector/Sphere", Proceedings of the 2010 IEEE Workshop on Many-Task Computing on Grids and Supercomputers (MTAGS), New Orleans, LA, USA, pp. 1-10, Nov. 15, 2010 (Nov. 15, 2010).
Gupta et al, "A Reputation System for Peer-to-Peer Networks", Proceedings of the 13th International Workshop on Network and operating systems support for digital audio and video NOSSDAV'03, Monterey, California, USA, Jun. 1-3, 2003 (Jun. 6, 2003).
Gupta et al., "Reputation Management Framework and its use as Currency in Large-Scale Peer-to-Peer Networks", Proceedings of the Fourth IEEE International Conference on Peer-to-Peer Computing P2P2004, Zurich, Switzerland, pp. 124-132, Aug. 25-27, 2004 (Aug. 25, 2004).
Hartley et al., "MSSG: A Framework for Massive-Scale Semantic Graphs", Proceedings of 2006 IEEE International Conference on Cluster Computing, CLUSTER'2006, Barcelona, Spain, pp. 1-10, Sep. 25-28, 2006 (Sep. 25, 2006).
Huynh et al., "An Integrated Trust and Reputation Model for Open Multi-Agent Systems", Journal of Autonomous Agents and Multi-Agent Systems, vol. 13, issue 2, Sep. 2006 (Sep. 2006).
Jøsang et al., "Simplification and Analysis of Transitive Trust Networks", Journal of Web Intelligence and Agent Systems, vol. 4, issue 2, Apr. 2006 (Apr. 2006).
Kamola et al., "Reconstruction of a Social Network Graph from Incomplete Call Detail Records", Conference Proceedings of the International Conference on Computational Aspects of Social Networks (CASoN), Oct. 19, 2011, pp. 136-140.
Kang et al., "PEGASUS: A Peta-Scale Graph Mining System Implementation and Observations", Proceedings of the Ninth IEEE International Conference on Data Mining, ICDM'09, Miami, FL, USA, pp. 229-238, Dec. 6-9, 2009 (Jun. 12, 2009).
Kim et al., "Design and Implementation of the Location-based Personalized Social Media Service", Conference Proceedings of the International Conference on Internet and Web Applications and Services (ICIW), May 9, 2010, pp. 116-121.
Lumsdaine et al., "Challenges in Parallel Graph Processing", Parallel Processing Letters, vol. 17, No. 1, pp. 5-20, Mar. 2007 (Mar. 2007).
Malewicz et al., "Pregel: a System for Large-Scale Graph Processing", Proceedings of the 2010 International Conference on Management Data, SIGMOD'10, Indianapolis, Indiana, USA, pp. 135-145, Jun. 6-11, 2010 (Jun. 6, 2010).
Mining social networks, "Untangling the social web", http://www.economist.com/node/16910031?story_id=16910031&fsrc=rss, Sep. 2, 2010, printed Nov. 6, 2010, 5 pages.
Mori et al., "Improving Deployability of Peer-Assisted CDN Platform with Incentive", Proceedings of IEEE Global Telecommunications Conference GLOBECOM 2009, Honolulu, Hawaii, USA, pp. 1-7, Nov. 30-Dec. 4, 2009 (Nov. 30, 2009).
Mui et al., "A Computational Model of Trust and Reputation", Proceedings of the 35th Annual Hawaii International Conference on System Sciences, HICSS '02, vol. 7, pp. 2431-2439, Jan. 7-10, 2002 (Jul. 1, 2002).
Safaei et al., "Social Graph Generation & Forecasting Using Social network Mining", Proceedings of the 33rd Annual IEEE International Computer Software and Applications Conference, COMPSAC '09, pp. 31-35, Jul. 20-24, 2009 (Jul. 20, 2009).
Zhang et al., "A Review of Incentive Mechanisms in Peer-to-Peer Systems", Proceedings of the First International Conference on Advances in P2P Systems AP2PS'09, Sliema, Malta, pp. 45-50, Oct. 11-16, 2009 (Nov. 20, 2009).
Zhang et al., "MARCH: A Distributed Incentive Scheme for Peer-to-Peer Networks", Proceedings of the 26th Annual IEEE Conference on Computer Communication INFOCOM 2007, Anchorage, Alaska, USA, pp. 1091-1099, May 6-12, 2007 (Jun. 5, 2007).

* cited by examiner

310

| Node Table | |
|---|---|
| RowId | 64-bit Integer |
| "info:inlinks" | List |
| "info:outlinks" | List |
| "info:oldHeadIdBuckets" | List |
| "bucket:" + target node id | List |

CALCULATING TRUST SCORES BASED ON SOCIAL GRAPH STATISTICS

CROSS-REFERENCE TO RELATED APPLICATIONS

This is a continuation application of U.S. patent application Ser. No. 13/582,387, filed Sep. 27, 2012, which is a national stage of International Patent Application No. PCT/CA2011/050125, filed Mar. 3, 2011, which claims priority benefit of U.S. Provisional Patent Application No. 61/310,844, filed Mar. 5, 2010. The aforementioned, earlier-filed applications are hereby incorporated by reference herein in their entireties.

BACKGROUND OF THE INVENTION

This invention relates generally to networks of individuals and/or entities and network communities and, more particularly, to systems and methods for determining trust scores or connectivity within or between individuals and/or entities or networks of individuals and/or entities.

The connectivity, or relationships, of an individual or entity within a network community may be used to infer attributes of that individual or entity. For example, an individual or entity's connectivity within a network community may be used to determine the identity of the individual or entity (e.g., used to make decisions about identity claims and authentication), the trustworthiness or reputation of the individual, or the membership, status, and/or influence of that individual in a particular community or subset of a particular community.

An individual or entity's connectivity within a network community, however, is difficult to quantify. For example, network communities may include hundreds, thousands, millions, billions or more members. Each member may possess varying degrees of connectivity information about itself and possibly about other members of the community. Some of this information may be highly credible or objective, while other information may be less credible and subjective. In addition, connectivity information from community members may come in various forms and on various scales, making it difficult to meaningfully compare one member's "trustworthiness" or "competence" and connectivity information with another member's "trustworthiness" or "competence" and connectivity information. Also, many individuals may belong to multiple communities, further complicating the determination of a quantifiable representation of trust and connectivity within a network community. Similarly, a particular individual may be associated with duplicate entries in one or more communities, due to, for example, errors in personal information such as name/information misspellings and/or outdated personal information. Even if a quantifiable representation of an individual's connectivity is determined, it is often difficult to use this representation in a meaningful way to make real-world decisions about the individual (e.g., whether or not to trust the individual).

Further, it may be useful for these real-world decisions to be made prospectively (i.e., in advance of an anticipated event). Such prospective analysis may be difficult as an individual or entity's connectivity within a network community may change rapidly as the connections between the individual or entity and others in the network community may change quantitatively or qualitatively. This analysis becomes increasingly complex as if applied across multiple communities.

SUMMARY OF THE INVENTION

In view of the foregoing, systems and methods are provided for determining the connectivity between nodes within a network community and inferring attributes, such as trustworthiness or competence, from the connectivity. Connectivity may be determined, at least in part, using various graph traversal and normalization techniques described in more detail below and in U.S. Provisional Patent Application Nos. 61/247,343, filed Sep. 30, 2009, 61/254,313, filed Oct. 23, 2009, 61/294,949, filed Jan. 14, 2010, 61/329,899, filed Apr. 30, 2010, and 61/383,583, filed Sep. 16, 2010, and in International Patent Application Nos. CA2010001531, filed Sep. 30, 2010, CA2010001658, filed Oct. 22, 2010, and CA2011050017, filed Jan. 14, 2011, each of which are hereby incorporated by reference herein in their entireties.

In an embodiment, a path counting approach may be used where processing circuitry is configured to count the number of paths between a first node $n_1$ and a second node $n_2$ within a network community. A connectivity rating $R_{n_1 n_2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user (i.e., the out-link values). If $t_i$ is the user connectivity value assigned to link i, then the relative user weight, $w_i$, assigned to that link may be given in accordance with:

$$w_i = 1 + (t_i - \bar{t}_i)^2 \qquad (1)$$

In some embodiments, an alternative relative user weight, $w_i'$, may be used based on the number of standard deviations, $\sigma$, the user connectivity value differs from the average value assigned by that user or node. For example, the alternative relative user weight may be given in accordance with:

$$w_i' = 1 - \frac{1}{2 + k^2} \qquad (2)$$

$$\text{where } k = \left\{ \begin{array}{l} 0, \text{ if } \sigma = 0 \\ \frac{t_i - \bar{t}_i}{\sigma}, \text{ otherwise} \end{array} \right\}$$

To determine the overall weight of a path, in some embodiments, the weights of all the links along the path may be multiplied together. The overall path weight may then be given in accordance with:

$$w_{path} = \Pi(w_i) \qquad (3)$$

or $$w_{path} = \Pi(w_i') \qquad (4)$$

The connectivity value for the path may then be defined as the minimum user connectivity value of all the links in the path multiplied by the overall path weight in accordance with:

$$t_{path} = w_{path} \times t_{min} \quad (5)$$

In some embodiments, the connectivity or trust rating between two nodes may be based on connectivity statistics values for one of the nodes. The connectivity rating or trust rating a first node has for a second node may be based on a connectivity between the first node and the second node and one or more connectivity statistics associated with the first node.

In other embodiments, only "qualified" paths may be used to determine connectivity values. A qualified path may be a path whose path weight meets any suitable predefined or dynamic criteria. For example, a qualified path may be a path whose path weight is greater than or equal to some threshold value. As described in more detail below, any suitable threshold function may be used to define threshold values. The threshold function may be based, at least in some embodiments, on empirical data, desired path keep percentages, or both. In some embodiments, threshold values may depend on the length, l, of the path. For example, an illustrative threshold function specifying the minimum path weight for path p may be given in accordance with:

$$\text{threshold}(p) = \begin{cases} 0.5, & \text{if } l = 1 \\ 0.428, & \text{if } l = 2 \\ 0.289, & \text{if } l = 3 \\ 0.220, & \text{if } l = 4 \\ 0.216, & \text{if } l = 5 \\ 0.192, & \text{if } l = 6 \end{cases} \quad (6)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, weight, connectivity, and/or connectivity statistics values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster. For example, in one embodiment, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold (or above a maximum threshold) may be ignored in a connectivity determination or connectivity computation, while only weights of sufficient magnitude may be considered.

In some embodiments, a user connectivity or trust value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. For example, one or more of the individual or entity's reputation within the network community (or some other community), the individual or entity's alignment with the trusting party (e.g., political, social, or religious alignment), past dealings with the individual or entity, and the individual or entity's character and integrity (or any other relevant considerations) may be used to determine a partially subjective user connectivity value indicative of trust. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

In other embodiments, the user connectivity or trust value may be calculated objectively. In one embodiment, the trust value of a first node for a second node may be calculated based on the number of paths linking the two nodes, one or more path scores associated with the linking paths, and connectivity statistics associated with the first node.

In some embodiments, a decision-making algorithm may access the connectivity values in order to make automatic decisions (e.g., automatic network-based decisions, such as authentication or identity requests) on behalf of a user. Connectivity values may additionally or alternatively be outputted to external systems and processes located at third-parties. The external systems and processes may be configured to automatically initiate a transaction (or take some particular course of action) based, at least in part, on received connectivity values. For example, electronic or online advertising may be targeted to subgroups of members of a network community based, at least in part, on network connectivity values.

In some embodiments, a decision-making algorithm may access connectivity values to make decisions prospectively (e.g., before an anticipated event like a request for credit). Such decisions may be made at the request of a user, or as part of an automated process (e.g., a credit bureau's periodic automated analysis of a database of customer information). This prospective analysis may allow for the initiation of a transaction (or taking of some particular action) in a fluid and/or dynamic manner.

In some embodiments, connectivity values may be used to present information to the user. This information may include, but is not limited to, static and/or interactive visualizations of connectivity values within a user's associated network community or communities. In some embodiments, this information may allow the user to explore or interact with an associated network community or communities, and encourage and/or discourage particular interactions within a user's associated network community or communities. In some embodiments, this information may explicitly present the user with the connectivity values. For example, a percentage may indicate how trustworthy another individual and/or entity is to a user. In some embodiments, the information may implicitly present the user with a representation of the connectivity values. For example, an avatar representing another individual and/or entity may change in appearance based on how trustworthy that individual and/or entity is to a user.

BRIEF DESCRIPTION OF THE DRAWINGS

The above and other features of the present invention, its nature and various advantages will be more apparent upon consideration of the following detailed description, taken in conjunction with the accompanying drawings, and in which:

FIGS. 3A and 3B show illustrative data tables for supporting connectivity determinations within a network community in accordance with one embodiment of the invention;

DETAILED DESCRIPTION

Systems and methods for determining the connectivity between nodes in a network community are provided. As defined herein, a "node" may include any user terminal, network device, computer, mobile device, access point, robot, or any other electronic device capable of being uniquely identified within a network community. For example, nodes may include robots (or other machines) assigned unique serial numbers or network devices assigned unique network addresses. In some embodiments, a node may also represent an individual human being, entity (e.g., a legal entity, such as a public or private company, corporation, limited liability company (LLC), partnership, sole proprietorship, or charitable organization), concept (e.g., a social networking group), animal, city/town/village, parcel of land (which may be identified by land descriptions), or inanimate object (e.g., a car, aircraft, or tool). As also defined herein, a "network community" may include a collection of nodes and may represent any group of devices, individuals, or entities.

For example, all or some subset of the users of a social networking website or social networking service (or any other type of website or service, such as an online gaming community) may make up a single network community. Each user may be represented by a node in the network community. As another example, all the subscribers to a particular newsgroup or distribution list may make up a single network community, where each individual subscriber may be represented by a node in the network community. Any particular node may belong in zero, one, or more than one network community, or a node may be banned from all, or a subset of, the community. To facilitate network community additions, deletions, and link changes, in some embodiments a network community may be represented by a directed graph, or digraph, weighted digraph, tree, or any other suitable data structure.

Figure 1:
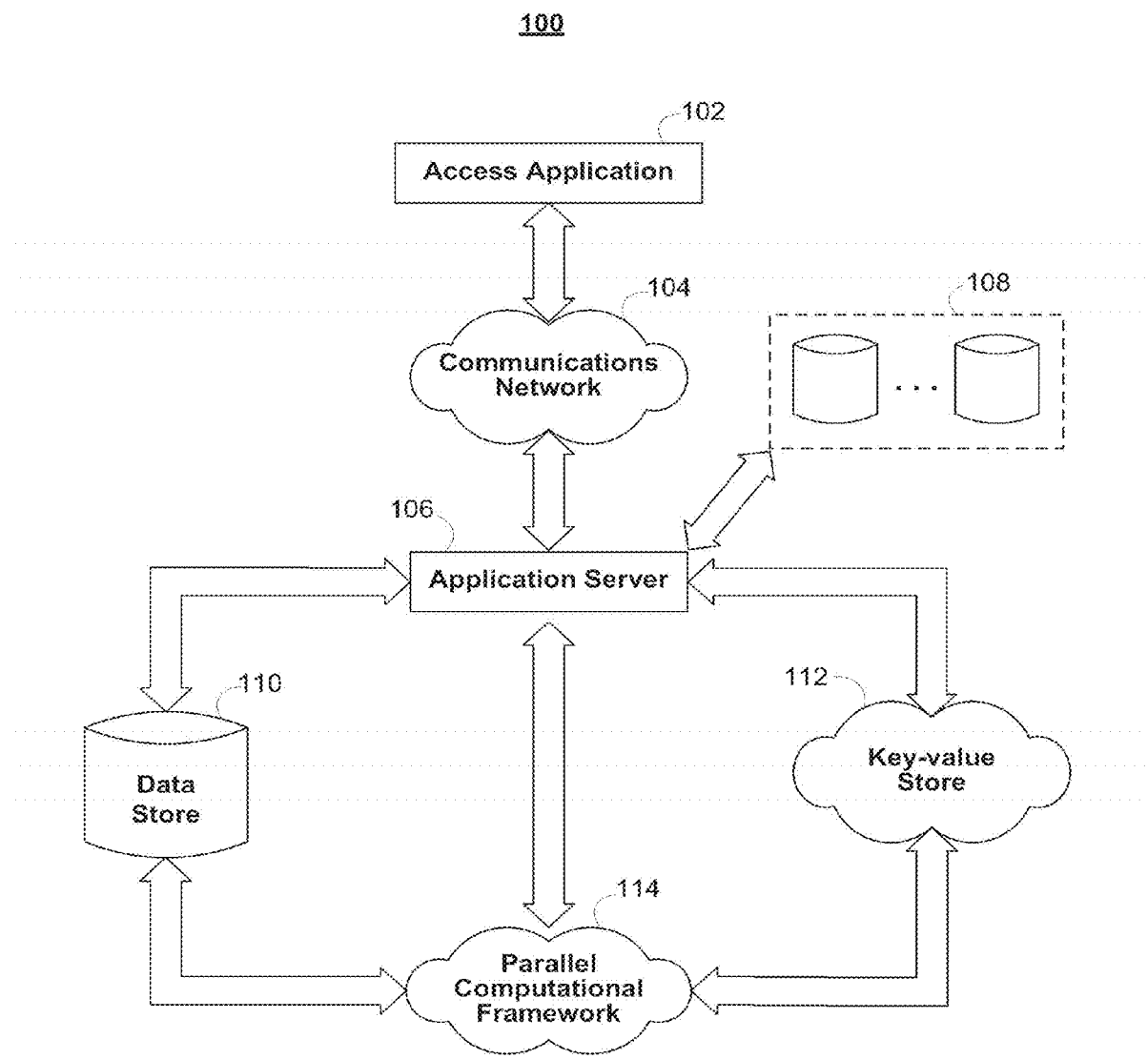
FIG. 1 is an illustrative block diagram of a network architecture used to support connectivity within a network community in accordance with one embodiment of the invention.

FIG. 1 shows illustrative network architecture 100 used to support the connectivity determinations within a network community. A user may utilize access application 102 to access application server 106 over communications network 104. For example, access application 102 may include a standard web browser, application server 106 may include a web server, and communication network 106 may include the Internet. Access application 102 may also include proprietary applications specifically developed for one or more platforms or devices. For example, access application 102 may include one or more instances of an Apple iOS, Android, WebOS, or any suitable application for use in accessing application server 106 over communications network 104. Multiple users may access application server 106 via one or more instances of access application 102. For example, a plurality of mobile devices may each have an instance of access application 102 running locally on the devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more microprocessors), memory (e.g., RAM, ROM, and hybrid types of memory), storage devices (e.g., hard drives, optical drives, and tape drives). The processing circuitry included in application server 106 may execute a server process for supporting the network connectivity determinations of the present invention, while access application 102 executes a corresponding client process. The processing circuitry included in application server 106 may also perform any of the calculations and computations described herein in connection with determining network connectivity. In some embodiments, a computer-readable medium with computer program logic recorded thereon is included within application server 106. The computer program logic may determine the connectivity between two or more nodes in a network community and it may or may not output such connectivity to a display screen or data store.

For example, application server 106 may access data sources 108 over the Internet, a secured private LAN, or any other communications network. Data sources 108 may include one or more third-party data sources, such as data from third-party social networking services third-party ratings bureaus, and document issuers (e.g., driver's license and license plate issuers, such as the Department of Motor Vehicles). For example, data sources 108 may include user and relationship data (e.g., "friend" or "follower" data) from one or more of Facebook, MySpace, openSocial, Friendster, Bebo, hi5, Orkut, PerfSpot, Yahoo! 360, Gmail, Yahoo! Mail, Hotmail, or other email based services and accounts, LinkedIn, Twitter, Google Buzz, Really Simply Syndication readers, or any other social networking website or information service. Data sources 108 may also include data stores and databases local to application server 106 containing relationship information about users accessing application server 106 via access application 102 (e.g., databases of addresses, legal records, transportation passenger lists, gambling patterns, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 300 (FIG. 3A) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs. For each input key-value pair, the map task may invoke a user defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
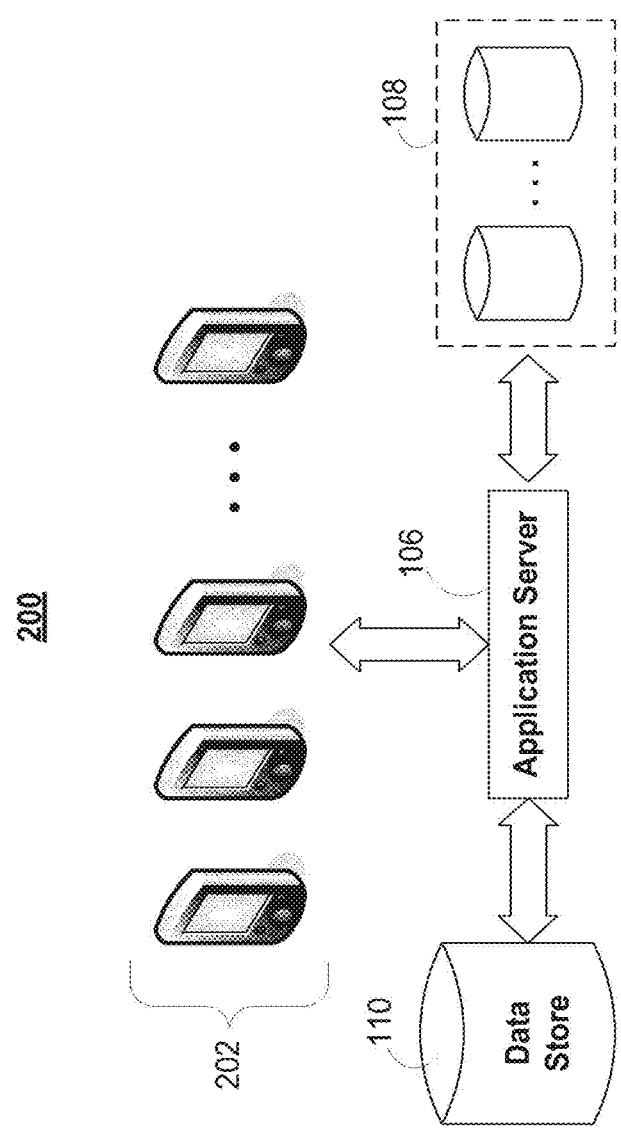
FIG. 2 is another illustrative block diagram of a network architecture used to support connectivity within a network community in accordance with one embodiment of the invention.

Although FIG. 1, in order to not over-complicate the drawing, only shows a single instance of access application 102, communications network 104, application server 106, data source 108, data store 110, key-value store 112, and parallel computational framework 114, in practice network architecture 100 may include multiple instances of one or more of the foregoing components. In addition, key-value store 112 and parallel computational framework 114 may also be removed, in some embodiments. As shown in network architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially-configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3A:
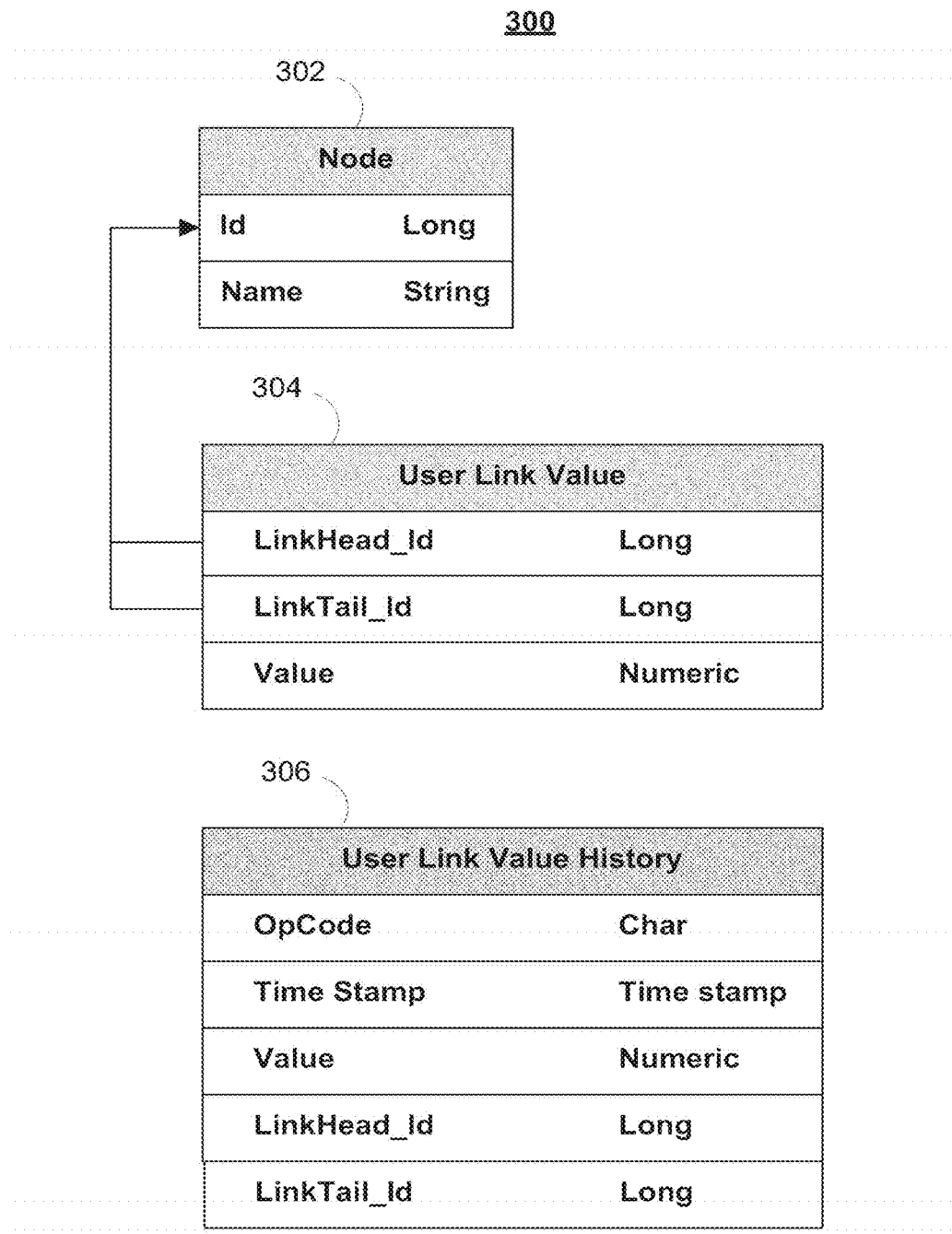

FIG. 3A shows illustrative data tables 300 used to support the connectivity determinations of the present invention. One or more of tables 300 may be stored in, for example, a relational database in data store 110 (FIG. 1). Table 302 may store an identification of all the nodes registered in the network community. A unique identifier may be assigned to each node and stored in table 302. In addition, a string name may be associated with each node and stored in table 302. As described above, in some embodiments, nodes may represent individuals or entities, in which case the string name may include the individual or person's first and/or last name, nickname, handle, or entity name.

Table 304 may store user connectivity values. User connectivity values may be positive, indicating some degree of trust between two or more parties, or may be negative, indicating some degree of distrust between two or more parties. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes, the content of the interaction, and/or the result of the interaction. For example, each simple email exchange between two nodes may automatically increase or decrease the user connectivity values connecting those two nodes by a fixed amount. In some embodiments, the content of the emails in the email exchange may be processed by, for example, application server 106 (FIG. 1) to determine the direction of the user connectivity value change as well as its magnitude. For example, an email exchange regarding a transaction executed in a timely fashion may increase the user connectivity value, whereas an email exchange regarding a missed deadline may decrease the user connectivity value. The content of the email exchange or other interaction may be processed by using heuristic and/or data/text mining techniques to parse the content of the interaction. For example, a language parser may be used to identify keywords in the email exchange. In some embodiments, individual emails and/or the email exchange may be processed to identify keywords that are associated with successful/favorable transactions and/or keywords that are associated with unsuccessful/unfavorable transactions, and the difference between the frequency/type of the keywords may affect the user connectivity value. In certain embodiments, natural language parsers may be used to extract semantic meaning from structured text in addition to keyword detection.

More complicated interactions (e.g., product or service sales or inquires) between two nodes may increase or decrease the user connectivity values connecting those two nodes by some larger fixed amount. In some embodiments, user connectivity values between two nodes may always be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In some embodiments, the magnitude of the user connectivity value change may be based on the content of the interactions. For example, a failed transaction involving a small monetary value may cause the user connectivity value to decrease less than a failed transaction involving a larger monetary value. In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. As described above, user connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. A composite user connectivity value including subjective and objective components may also be used. For example, third-party information may be consulted to form an objective component based on, for example, the number of consumer complaints, credit score, socio-economic factors (e.g., age, income, political or religions affiliations, and criminal history), or number of citations/hits in the media or in search engine searches. Third-party information may be accessed using communications network 104 (FIG. 1). For example, a third-party credit bureau's database may be polled or a personal biography and background information, including criminal history information, may be accessed from a third-party database or data source (e.g., as part of data sources 108 (FIG. 1) or a separate data source) or input directly by a node, user, or system administrator. In some embodiments, the third-party data source(s) or system(s) may also include third-party user connectivity values and transaction histories, related to user interactions with the third-party system(s). In these embodiments, the user connectivity value or composite user connectivity value may also include one or more components based on the third-party user connectivity values and transaction histories.

In other embodiments, the user connectivity or trust value may be calculated objectively. In one embodiment, the trust value of a first node for a second node may be calculated based on the number of paths linking the two nodes, one or more path scores associated with the linking paths, and connectivity statistics associated with the first node.

Table 304 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 306 may store an audit log of table 304. Table 306 may be analyzed to determine which nodes or links have changed in the network community. In some embodiments, a database trigger is used to automatically insert an audit record into table 306 whenever a change of the data in table 304 is detected. For example, a new link may be created, a link may be removed, and/or a user connectivity value may be changed. This audit log may allow for decisions related to connectivity values to be made prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner. After such a change is detected, the trigger may automatically create a new row in table 306. Table 306 may store an identification of the changed node, and identification of the changed link head, changed link tail, and/or the user connectivity value to be assigned to the changed link. Table 306 may also store a timestamp indicative of the time of the change and/or an operation code. In some embodiments, operation codes may include "insert," "update," and/or "delete" operations, corresponding to whether a link was inserted, a user connectivity value was changed, or a link was deleted, respectively. Other operation codes may be used in other embodiments.

FIG. 3B shows illustrative data structure 310 used to support the connectivity determinations of the present invention. In some embodiments, data structure 310 may be stored using key-value store 112 (FIG. 1), while tables 300 are stored in data store 110 (FIG. 1). As described above, key-value store 112 (FIG. 1) may implement an HBase storage system and include BigTable support. Like a traditional relational database management system, the data shown in FIG. 3B may be stored in tables. However, the BigTable support may allow for an arbitrary number of columns in each table, whereas traditional relational database management systems may require a fixed number of columns.

Data structure 310 may include node table 312. In the example shown in FIG. 3B, node table 312 includes several columns. Node table 312 may include row identifier column 314, which may store 64-bit, 128-bit, 256-bit, 512-bit, or 1024-bit integers and may be used to uniquely identify each row (e.g., each node) in node table 312. Column 316 may include a list of all the incoming links for the current node. Column 318 may include a list of all the outgoing links for the current node. Column 320 may include a list of node identifiers to which the current node is connected. A first node may be connected to a second node if outgoing links may be followed to reach the second node. For example, for A-> B, A is connected to B, but B may not be connected to A. As described in more detail below, column 320 may be used during the portion of process 400 (FIG. 4A) shown in FIG. 4B. Node table 312 may also include one or more "bucket" columns 322. These columns may store a list of paths that connect the current node to a target node. As described above, grouping paths by the last node in the path (e.g., the target node) may facilitate connectivity computations. As shown in FIG. 3B, in some embodiments, to facilitate scanning, bucket column names may include the target node identifier appended to the end of the "bucket:" column name.

Figure 4A:
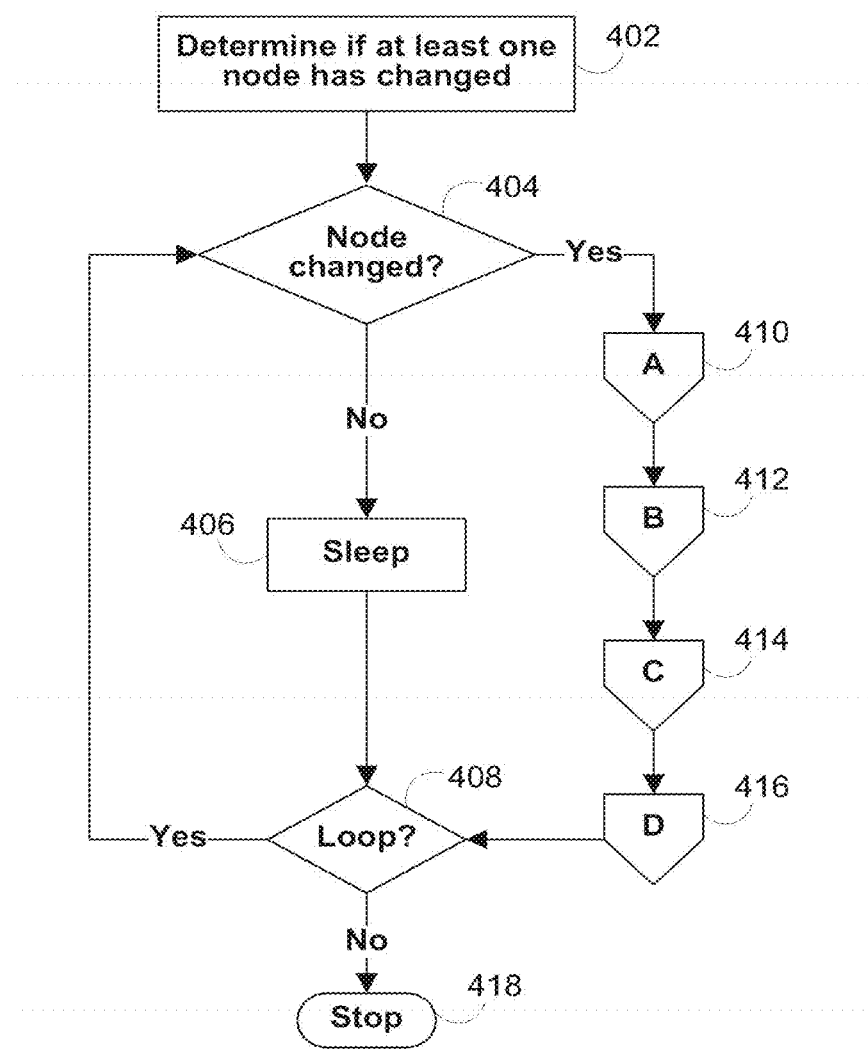
FIGS. 4A-4E show illustrative processes for supporting connectivity determinations within a network community in accordance with one embodiment of the invention.

FIGS. 4A-4E show illustrative processes for determining the connectivity of nodes within a network community. FIG. 4A shows process 400 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIG. 4A-4E may be executed to make decisions prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner.

In some embodiments, the processes described with respect to FIG. 4A-4E may be executed to provide information to a user. Such presentations may be made at the request of a user, or as part of an automated presentation. This information may include, but is not limited to, static and/or interactive visualizations of connectivity values within a user's associated network community or communities. In some embodiments, this information may be integrated into explorations of or interactions within a user's associated network community or communities. Providing this information to a user may allow the user to better understand what other individuals and/or entities they may trust within a network community, and/or may encourage and/or discourage particular interactions within a user's associated network community or communities.

At step 402, a determination is made whether at least one node has changed in the network community. As described above, an audit record may be inserted into table 306 (FIG. 3) after a node has changed. By analyzing table 306 (FIG. 3), a determination may be made (e.g., by application server 106 of FIG. 1) that a new link has been added, an existing link has been removed, or a user connectivity value has changed. If, at step 404, it is determined that a node has changed, then process 400 continues to step 410 (shown in FIG. 4B) to prepare the changed nodes, step 412 (shown in FIG. 4C) to calculate paths originating from the changed nodes, step 414 (shown in FIG. 4D) to remove paths that go through a changed node, and step 416 (shown in FIG. 4E) to calculate paths that go through a changed node. It should be noted that more than one step or task shown in FIGS. 4B, 4C, 4D, and 4E may be performed in parallel using, for example, a cluster of cores. For example, multiple steps or tasks shown in FIG. 4B may be executed in parallel or in a distributed fashion, then multiple steps or tasks shown in FIG. 4C may be executed in parallel or in a distributed fashion, then multiple steps or tasks shown in FIG. 4D may be executed in parallel or in a distributed fashion, and then multiple steps or tasks shown in FIG. 4E may be executed in parallel or in a distributed fashion. In this way, overall latency associated with process 400 may be reduced.

If a node change is not detected at step 404, then process 400 enters a sleep mode at step 406. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 416 or after a period of sleep at step 406, process 400 may determine whether or not to loop at step 408. For example, if all changed nodes have been updated, then process 400 may stop at step 418. If, however, there are more changed nodes or links to process, then process 400 may loop at step 408 and return to step 404.

In practice, one or more steps shown in process 400 may be combined with other steps, performed in any suitable order, performed in parallel (e.g., simultaneously or substantially simultaneously), or removed.

Figure 4B:
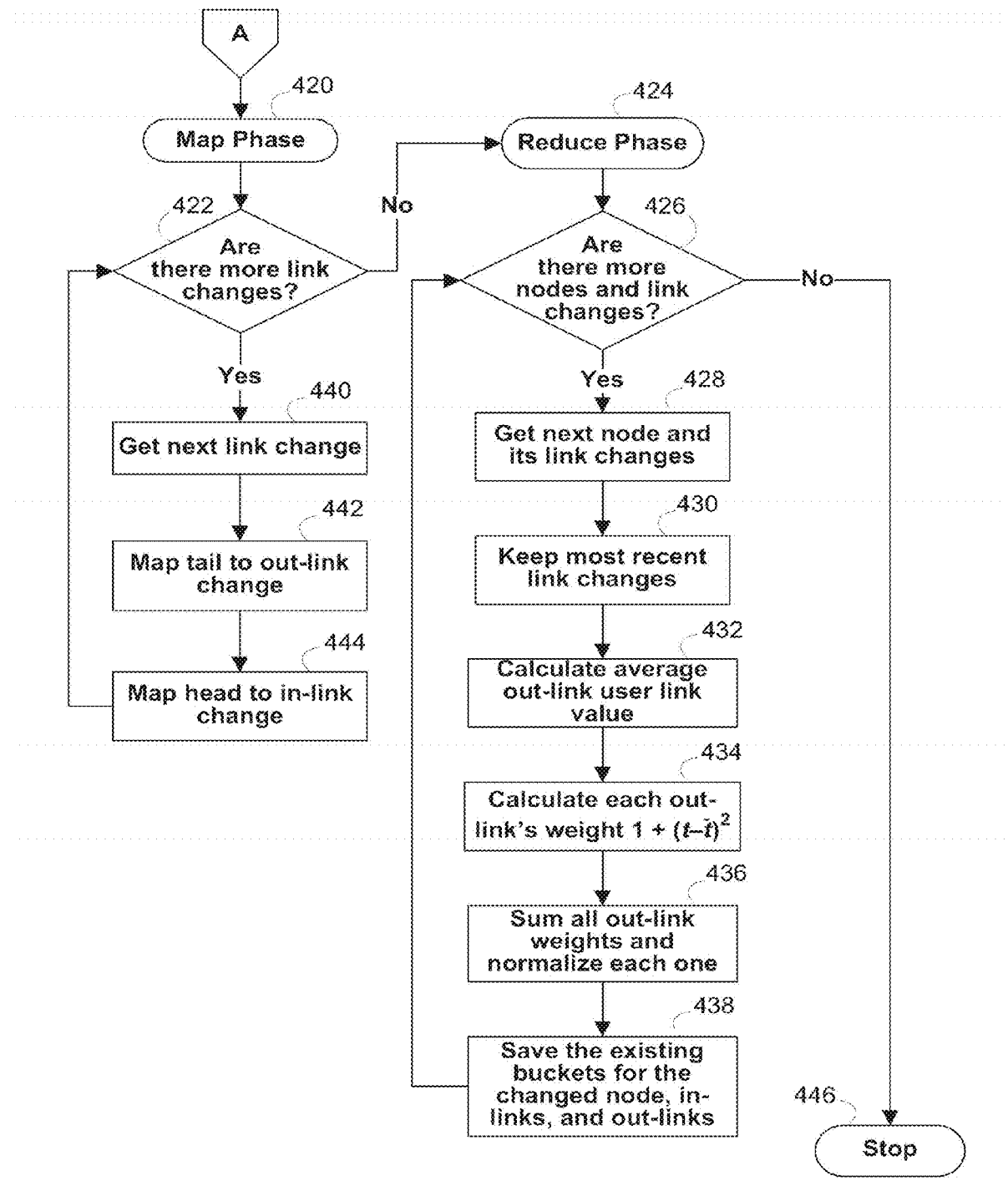

FIGS. 4B-4E each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 4B, in order to prepare any changed nodes, map phase 420 may include determining if there are any more link changes at step 422, retrieving the next link change at step 440, mapping the tail to out-link change at step 442, and mapping the head to in-link change at step 444.

If there are no more link changes at step 422, then, in reduce phase 424, a determination may be made at step 426 that there are more nodes and link changes to process. If so, then the next node and its link changes may be retrieved at step 428. The most recent link changes may be preserved at step 430 while any intermediate link changes are replaced by more recent changes. For example, the timestamp stored in table 306 (FIG. 3) may be used to determine the time of every link or node change. At step 432, the average out-link user connectivity value may be calculated. For example, if node $n_1$ has eight out-links with assigned user connectivity values, these eight user connectivity values may be averaged at step 432. At step 434, each out-link's weight may be calculated in accordance with equation (1) above. All the out-link weights may then be summed and used to normalize each out-link weight at step 436. For example, each out-link weight may be divided by the sum of all out-link weights. This may yield a weight between 0 and 1 for each out-link. At step 438, the existing buckets for the changed node, in-links, and out-links may be saved. For example, the buckets may be saved in key-value store 112 (FIG. 1) or data store 110 (FIG. 1). If there are no more nodes and link changes to process at step 426, the process may stop at step 446.

Figure 4C:
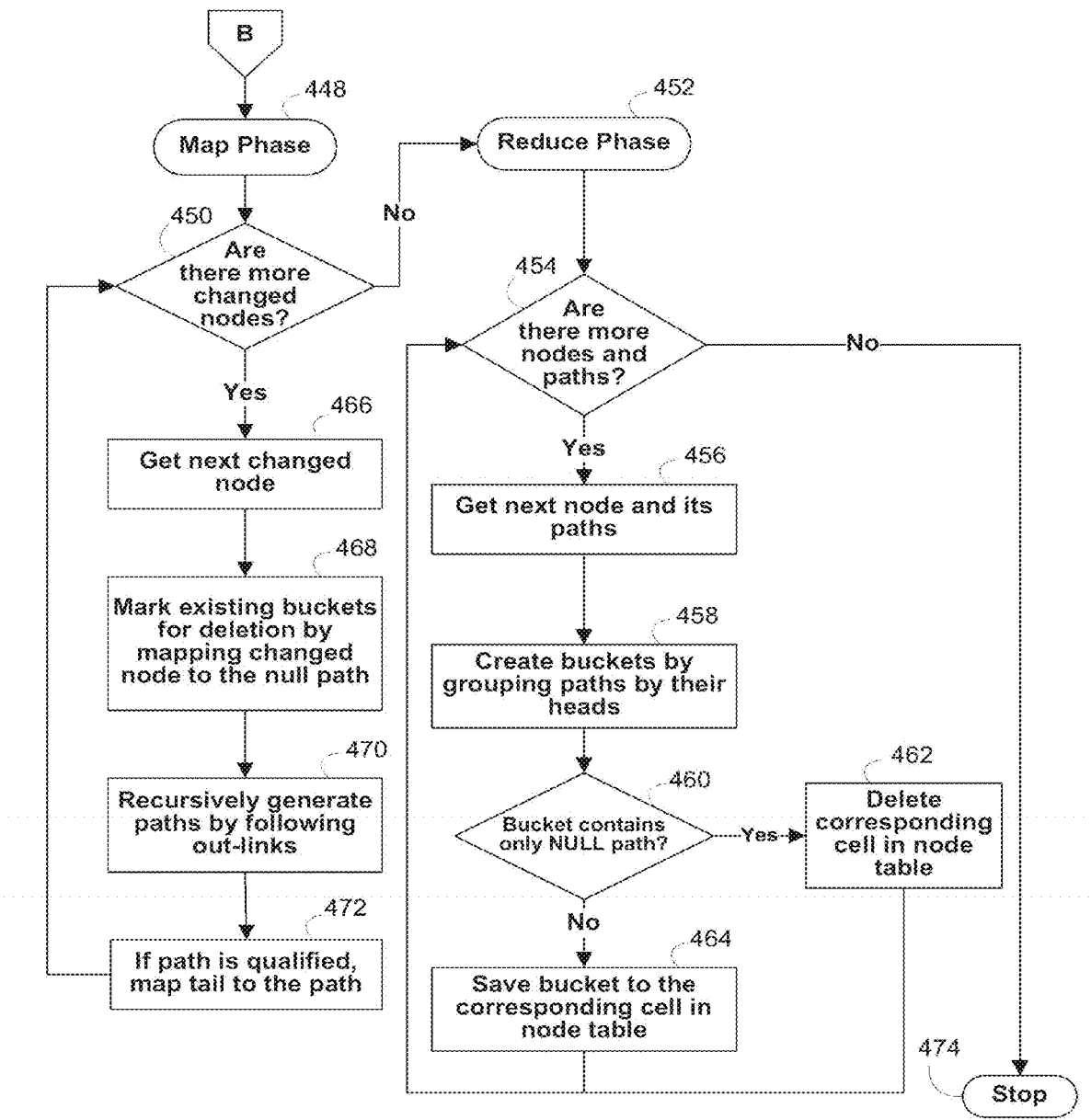

As shown in FIG. 4C, in order to calculate paths originating from changed nodes, map phase 448 may include determining if there are any more changed nodes at step 450, retrieving the next changed node at step 466, marking existing buckets for deletion by mapping changed nodes to the NULL path at step 468, recursively generating paths by following out-links at step 470, and if the path is a qualified path, mapping the tail to the path. Qualified paths may include paths that satisfy one or more predefined threshold functions. For example, a threshold function may specify a minimum or a maximum path weight. Paths with path weights greater than the minimum path weight and/or less than the maximum path weight may be designated as qualified paths.

If there are no more changed nodes at step 450, then, in reduce phase 452, a determination may be made at step 454 that there are more nodes and paths to process. If so, then the next node and its paths may be retrieved at step 456. At step 458, buckets may be created by grouping paths by their head. If a bucket contains only the NULL path at step 460, then the corresponding cell in the node table may be deleted at step 462. If the bucket contains more than the NULL path, then at step 464 the bucket is saved to the corresponding cell in the node table. If there are no more nodes and paths to process at step 456, the process may stop at step 474.

Figure 4D:
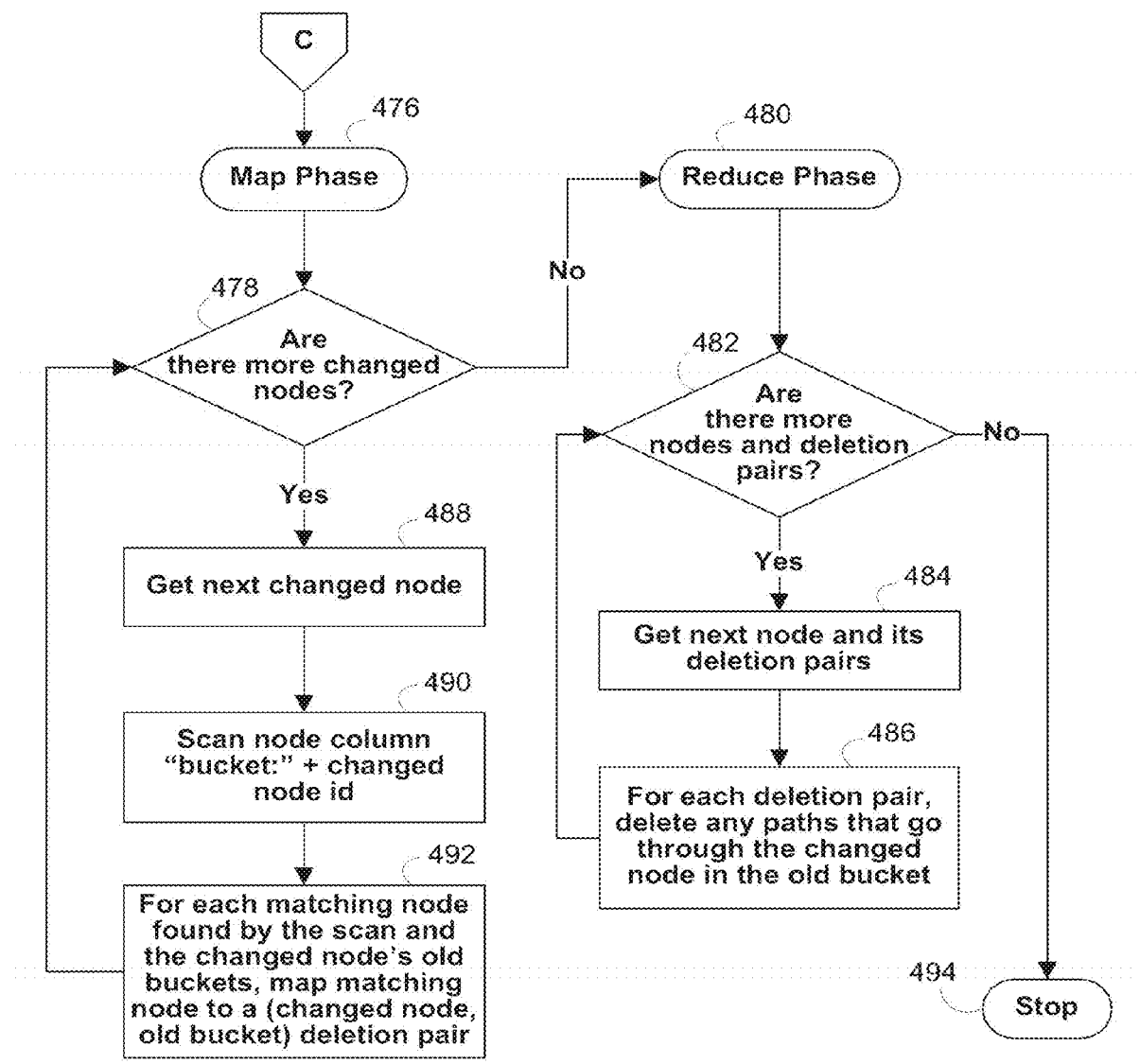

As shown in FIG. 4D, in order to remove paths that go through a changed node, map phase 476 may include determining if there are any more changed nodes at step 478 and retrieving the next changed node at step 488. At step 490, the "bucket:" column in the node table (e.g., column 322 of node table 312 (both of FIG. 3B)) corresponding to the changed node may be scanned. For example, as described above, the target node identifier may be appended to the end of the "bucket:" column name. Each bucket may include a list of paths that connect the current node to the target node (e.g., the changed node). At step 492, for each matching node found by the scan and the changed node's old buckets, the matching node may be matched to a (changed node, old bucket) deletion pair.

If there are no more changed nodes at step 478, then, in reduce phase 480, a determination may be made at step 484 that there are more node and deletion pairs to process. If so, then the next node and its deletion pairs may be retrieved at step 484. At step 486, for each deletion pair, any paths that go through the changed node in the old bucket may be deleted. If there are no more nodes and deletion pairs to process at step 482, the process may stop at step 494.

Figure 4E:
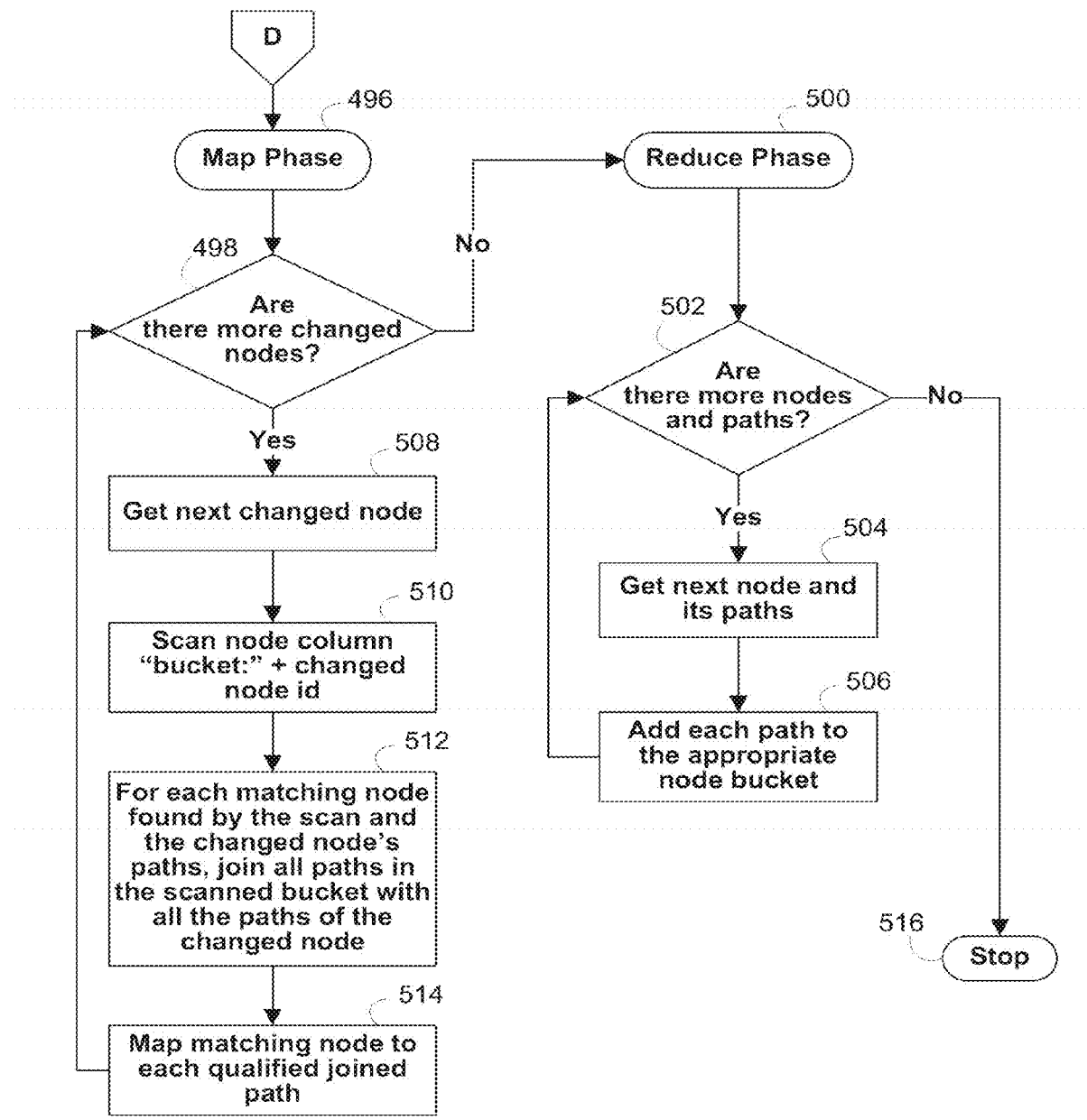

As shown in FIG. 4E, in order to calculate paths that go through a changed node, map phase 496 may include determining if there are any more changed nodes at step 498 and retrieving the next changed node at step 508. At step 510, the "bucket:" column in the node table (e.g., column 322 of node table 312 (both of FIG. 3B)) corresponding to the changed node may be scanned. At step 512, for each matching node found in the scan and the changed node's paths, all paths in the scanned bucket may be joined with all paths of the changed bucket. At step 514, each matching node may be mapped to each qualified joined path.

If there are no more changed nodes at step 498, then, in reduce phase 500, a determination may be made at step 502 that there are more node and paths to process. If so, then the next node and its paths may be retrieved at step 504. Each path may then be added to the appropriate node bucket at step 506. If there are no more nodes and paths to process at step 502, the process may stop at step 516.

Figure 5:
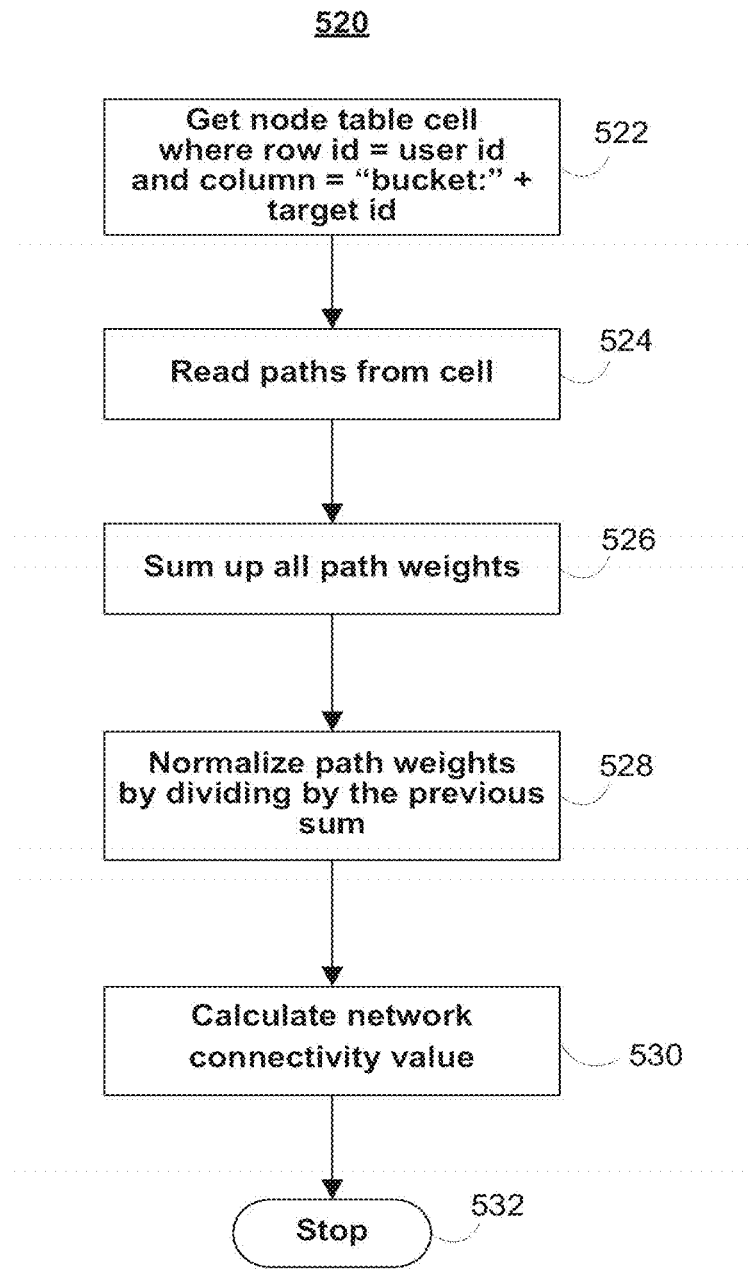
FIG. 5 shows an illustrative process for querying all paths to a target node and computing a network connectivity value in accordance with one embodiment of the invention.

FIG. 5 shows illustrative process 520 for supporting a user query for all paths from a first node to a target node. For example, a first node (representing, for example, a first individual or entity) may wish to know how connected the first node is to some second node (representing, for example, a second individual or entity) in the network community. In the context of trust described above (and where the user connectivity values represent, for example, at least partially subjective user trust values), this query may return an indication of how much the first node may trust the second node. In general, the more paths connecting the two nodes may yield a greater (or lesser if, for example, adverse ratings are used) network connectivity value (or network trust amount).

At step 522, the node table cell where the row identifier equals the first node identifier and the column equals the target node identifier appended to the "bucket:" column name prefix is accessed. All paths may be read from this cell at step 524. The path weights assigned to the paths read at step 524 may then be summed at step 526. At step 528, the path weights may be normalized by dividing each path weight by the computed sum of the path weights. A network connectivity value may then be computed at step 530. For example, each path's user connectivity value may be multiplied by its normalized path weight. The network connectivity value may then be computed in some embodiments in accordance with:

$$t_{network} = \Sigma t_{path} \times w_{path} \quad (7)$$

where $t_{path}$ is the user connectivity value for a path (given in accordance with equation (5)) and $w_{path}$ is the normalized weight for that path. The network connectivity value may then be held or, output by processing circuitry of application server 106, and/or stored on data store 110 (FIG. 1). In addition, a decision-making algorithm may access the network connectivity value in order to make automatic decisions (e.g., automatic network-based decisions, such as authentication or identity requests) on behalf of the user. Network connectivity values may additionally or alternatively be outputted to external systems and processes located at third-parties. The external systems and processes may be configured to automatically initiate a transaction (or take some particular course of action) based, at least in part, on the received network connectivity values. For example, some locales or organizations may require identity references in order to apply for a document (e.g., a passport, driver's license, group or club membership card, etc.). The identity reference or references may vouch that an individual actually exists and/or is the individual the applicant is claiming to be. Network connectivity values may be queried by the document issuer (e.g., a local government agency, such as the Department of Motor Vehicles or a private organization) and used as one (or the sole) metric in order to verify the identity of the applicant, the identity of an identity reference, or both. In some embodiments, network connectivity values may be used as an added assurance of the identity of an applicant or reference in conjunction with more traditional forms of identification (e.g., document verification and knowledge-based identity techniques). If the document issuer (or some other party trusted by the document issuer) has a set of strong paths from the applicant or reference, this may indicate a higher degree of confidence in the identity of the applicant or reference. Such an indication may be outputted to the third-party system or process. Process 520 may stop at step 532.

In practice, one or more steps shown in process 520 may be combined with other steps, performed in any suitable order, performed in parallel (e.g., simultaneously or substantially simultaneously), or removed. In addition, as described above, various threshold functions may be used in order to reduce computational complexity. For example, one or more threshold functions defining the maximum and/or minimum number of links to traverse may be defined. Paths containing more than the maximum number of links or less than the minimum number of links specified by the threshold function(s) may not be considered in the network connectivity determination. In addition, various maximum and/or minimum threshold functions relating to link and path weights may be defined. Links or paths above a maximum threshold weight or below a minimum threshold weight specified by the threshold function(s) may not be considered in the network connectivity determination.

Although process 520 describes a single user query for all paths from a first node to a target node, in actual implementations groups of nodes may initiate a single query for all the paths from each node in the group to a particular target node. For example, multiple members of a network community may all initiate a group query to a target node. Process 520 may return an individual network connectivity value for each querying node in the group or a single composite network connectivity value taking into account all the nodes in the querying group. For example, the individual network connectivity values may be averaged to form a composite value or some weighted average may be used. The weights assigned to each individual network connectivity value may be based on seniority in the community (e.g., how long each node has been a member in the community), rank, or social stature. In addition, in some embodiments, a user may initiate a request for network connectivity values for multiple target nodes in a single query. For example, node $n_1$ may wish to determine network connectivity values between it and multiple other nodes. For example, the multiple other nodes may represent several candidates for initiating a particular transaction with node $n_1$. By querying for all the network connectivity values in a single query, the computations may be distributed in a parallel fashion to multiple cores so that some or all of the results are computed substantially simultaneously.

In addition, queries may be initiated in a number of ways. For example, a user (represented by a source node) may identify another user (represented by a target node) in order to automatically initiate process 520. A user may identify the target node in any suitable way, for example, by selecting the target node from a visual display, graph, or tree, by inputting or selecting a username, handle, network address, email address, telephone number, geographic coordinates, or unique identifier associated with the target node, or by speaking a predetermined command (e.g., "query node 1" or "query node group 1, 5, 9" where 1, 5, and 9 represent unique node identifiers). After an identification of the target node or nodes is received, process 520 may be automatically executed. The results of the process (e.g., the individual or composite network connectivity values) may then be automatically sent to one or more third-party services or processes as described above.

In an embodiment, a user may utilize access application 102 to generate a user query that is sent to access application server 106 over communications network 104 (see also, FIG. 1) and automatically initiate process 520. For example, a user may access an Apple iOS, Android, or Webs application or any suitable application for use in accessing application 106 over communications network 104. The application may display a searchable list of relationship data related to that user (e.g., "friend" or "follower" data) from one or more of Facebook, MySpace, open Social, Friendster, Bebop, hi5, Rout, PerfSpot, Yahoo! 360, LinkedIn, Twitter, Google Buzz, Really Simple Syndication readers or any other social networking website or information service. In some embodiments, a user may search for relationship data that is not readily listed—i.e., search Facebook, Twitter, or any suitable database of information for target nodes that are not displayed in the searchable list of relationship data. A user may select a target node as described above (e.g., select an item from a list of usernames representing a "friend" or "follower") to request a measure of how connected the user is to the target node. Using the processes described with respect to FIGS. 3A, 3B and 4A-E, this query may return an indication of how much the user may trust the target node. The returned indication may be displayed to the user using any suitable indicator. In some embodiments, indicator may be a percentage that indicates how trustworthy the target node is to the user.

In some embodiments, a user may utilize access application 102 to provide manual assignments of at least partially subjective indications of how trustworthy the target node is. For example, the user may specify that he or she trusts a selected target node (e.g., a selected "friend" or "follower") to a particular degree. The particular degree may be in the form of a percentage that represents the user's perception of how trustworthy the target node is. The user may provide this indication before, after, or during process 520 described above. The indication provided by the user (e.g., the at least partially subjective indications of trustworthiness) may then be automatically sent to one or more third-party services or processes as described above. In some embodiments, the indications provided by the user may cause a node and/or link to change in a network community. This change may cause a determination to be made that at least one node and/or link has changed in the network community, which in turn triggers various processes as described with respect to FIGS. 3A, 3B and 4A-4E.

In some embodiments, a user may utilize access application 102 to interact with or explore a network community. For example, a user may be presented with an interactive visualization that includes one or more implicit or explicit representations of connectivity values between the user and other individuals and/or entities within the network community. This interactive visualization may allow the user to better understand what other individuals and/or entities they may trust within a network community, and/or may encourage and/or discourage particular interactions within a user's associated network community or communities.

In some embodiments, a path counting approach may be used in addition to or in place of the weighted link approach described above. Processing circuitry (e.g., of application server 106) may be configured to count the number of paths between a first node $n_1$ and a second node $n_2$ within a network community. A connectivity rating $R_{n_1 n_2}$ may then be assigned to the nodes. The assigned connectivity rating may be proportional to the number of paths, or relationships, connecting the two nodes. A path with one or more intermediate nodes between the first node $n_1$ and the second node $n_2$ may be scaled by an appropriate number (e.g., the number of intermediate nodes) and this scaled number may be used to calculate the connectivity rating.

Figure 6:
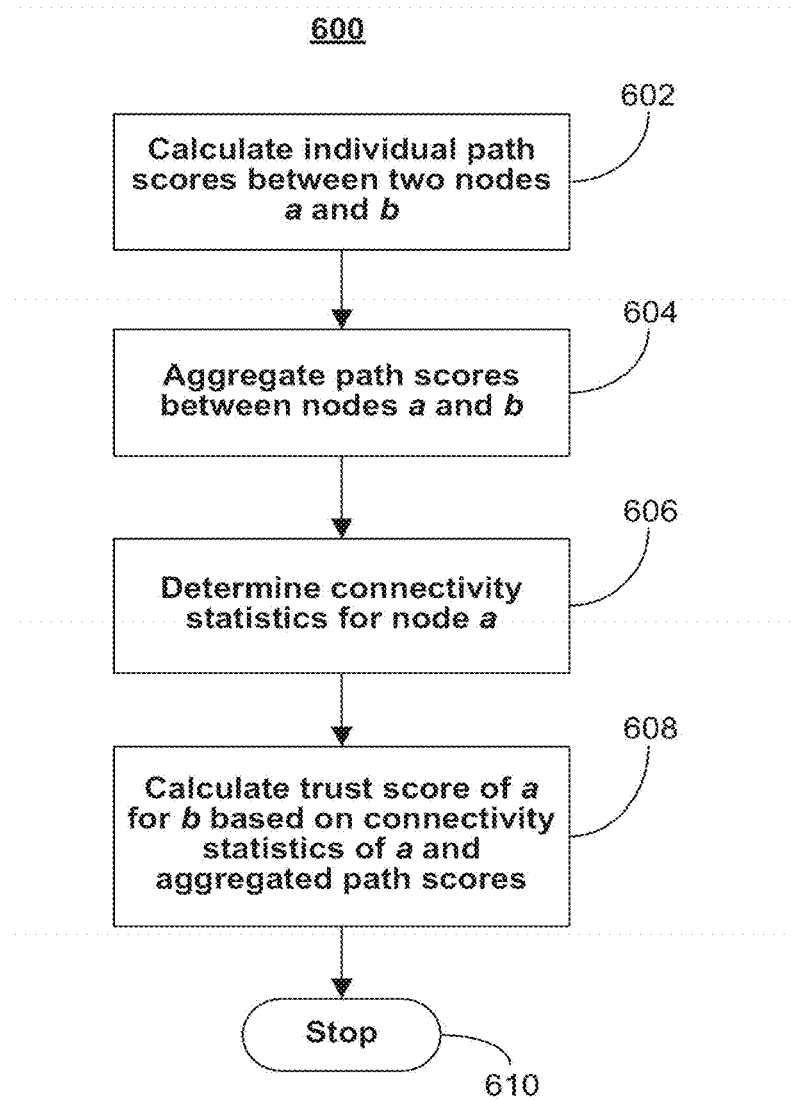
FIG. 6 shows an illustrative process for determining a connectivity or trust score of one node for another node based on connectivity statistics, in accordance with one embodiment of the invention.

In certain embodiments, the connectivity statistics of one or more nodes may be used to determine the connectivity score or rating between one node and another node. FIG. 6 shows illustrative process 600 for determining a connectivity or trust score of a node a for another node b based on connectivity statistics, in accordance with one embodiment of the invention. In step 602, a path score is determined for each path between node a and node b. In some embodiments, path scores may vary as a function of the path length. For example, the path score of a particular path may be calculated in accordance with:

$$PathScore(\text{path}) = \frac{1}{\text{Length(path)}^2} \qquad (8)$$

where Length(path) is the length of a particular path between a and b, for example in terms of the number of nodes the path passes through. While in equation (8), the path score is shown to vary inversely according to the square of the length of the path, in other embodiments, the exponent may vary, and/or the path score function may vary according to some other function of path length. In some embodiments, the path score may also be based on one or more specific ratings or weights associated with one or more edges along the path, where an edge is a path between two adjacent nodes. For example, the path score may vary either directly or inversely proportional to the sum or the product of one or more ratings or weights associated with each edge along the path. In some embodiments, only the ratings or weights associated with specific edges may be included, and in other embodiments, ratings or weights associated with all of the edges in a particular path may be considered.

In some embodiments, the path score may vary as one or more functions of the weights associated with one or more edges along the path. For example, the path score of a particular path may be calculated in accordance with:

$$PathScore(\text{path}) = g(\text{path}) * \prod_{edge \in path} f(w_{edge}) \qquad (9)$$

where f(w) is defined in accordance with:

$$f(w) = \begin{cases} 4, & \text{if } w < 0.2 \\ 2, & \text{if } 0.2 \le w < 0.4 \\ 1, & \text{if } 0.4 \le w < 0.8 \\ 2, & \text{if } 0.8 \le w < 1.0 \\ 4, & \text{if } w = 1.0 \end{cases} \qquad (10)$$

and g(path) is defined in accordance with:

$$g(\text{path}) = \begin{cases} -1, & \exists w_{edge} < .6 \\ 1, & \text{otherwise} \end{cases} \qquad (11)$$

After path scores for one or more of the paths linking nodes a and b have been calculated in step 602, the calculated path scores may be aggregated in step 604 to result in a connectivity value between the two nodes. The connectivity value between nodes a and b may be given in accordance with:

$$\text{Connectivity}(a, b) = \sum_{p \in Paths(a,b)} PathScore(p) \qquad (12)$$

where Paths(a,b) represent one or more of the paths between nodes a and b and PathScore(p) represents the path score of one of the paths in Paths(a,b) (i.e., one of the paths between nodes a and b). While in equation (12), the connectivity between nodes a and b is a summation of path scores associated with one or more paths between a and b, in other embodiments, the connectivity may be a product or any other function of the path scores associated with one or more paths between a and b.

In step 606, the connectivity statistics for node a may be determined. First, a node sample may be selected for node a. In one embodiment, the node sample may include nodes that meet some network parameter with respect to node a. For example, every individual node with a network distance less than or equal to some number x from node a (i.e., a path exists from the node to node a with length less than or equal to x) may be included in the node sample. For example, in certain embodiments, every individual node with a network distance less than or equal to 3 from node a may be included in the node sample. In some embodiments, the node sample may include a certain number of individual nodes randomly selected from the population. In some embodiments, the node sample may include a certain number of individual nodes visited via a random exploration of the network, starting from node a, in a manner similar to a graph traversal. In some embodiments, the node sample may include a certain number of nodes that are directly connected to a. For example, in certain embodiments, the node sample may include every node with a network distance of 1 from node a. In other embodiments, any other suitable method for selecting individual nodes in the network may be used to create the node sample.

Once the sample has been selected, a mean path score $\mu_a$, in accordance with:

$$\mu_a = \frac{1}{|S|} \sum_{y \in S} \text{Connectivity}(a, y) \quad (13)$$

and a standard deviation $\sigma_a$, in accordance with:

$$\sigma_a = \sqrt{\frac{1}{|S|} \sum_{y \in S} (\text{Connectivity}(a, y) - \mu_a)^2} \quad (14)$$

may be calculated for node a, where S is the number of individual nodes in the sample and Connectivity(a,y) is the connectivity (as described above in equation (12)) between node a and a node y in the sample S.

Once the connectivity statistics have been determined for node a, the trust or connectivity score (not to be confused with the connectivity described above in equation (12)) of node a for node b may be determined in step 608, based on the connectivity statistics of node a and the connectivity between node a and node b. In one embodiment, the trust or connectivity score may be determined as a function of the area under the normal curve for $\mu_a$ and $\sigma_a$. For example, let n be the number of standard deviations the connectivity between node a and node b is away from the mean path score $\mu_a$:

$$n = \frac{\text{Connectivity}(a, b) - \mu_a}{\sigma_a} \quad (15)$$

The trust or connectivity score between node a and node b TrustScore(a,b) may then be determined as a function of the area under the normal curve, in accordance with:

$$\text{TrustScore}(a, b) = 0.5 + \frac{\text{erf}\left(\frac{n}{\sqrt{2}}\right)}{2} \quad (16)$$

In some embodiments, the trust score may be used as is, be multiplied by 100 and presented as a percentage, or be multiplied by 1000 and presented as a number. The process 600 may then stop at step 610.

Each equation presented above should be construed as a class of equations of a similar kind, with the actual equation presented being one representative example of the class. For example, the equations presented above include all mathematically equivalent versions of those equations, reductions, simplifications, normalizations, and other equations of the same degree.

The above described embodiments of the invention are presented for purposes of illustration and not of limitation. The following claims give additional embodiments of the present invention.

What is claimed is:

1. A method for determining network connectivity between a first node and a second node, the method comprising:
   accessing, by a system comprising processor, a database comprising information regarding a plurality of nodes and a plurality of paths of a network community, the plurality of nodes including the first node and the second node;
   identifying, by the system, a node sample comprising a subset of the plurality of nodes, each of the nodes of the node sample connected to the first node by at least one path;
   retrieving, by the system, from the database, information identifying paths from the first node to each of the nodes of the node sample;
   determining, by the system, a plurality of connectivity values, wherein the plurality of connectivity values comprise connectivity values from the first node to each of the nodes of the node sample;
   determining, by the system, connectivity statistics based on a plurality of the determined connectivity values;
   determining, by the system, a connectivity value from the first node to the second node; and
   in response to determining, by the system, the network connectivity between the first node and the second node based on the determined connectivity statistics and the determined plurality of connectivity values from the first node to the second node, updating a stored network connectivity value for a first path of the paths between the first and second nodes and initiating a transaction based, at least in part, on the stored network connectivity value for the first path between the first and the second nodes.

2. The method of claim 1, wherein determining the connectivity value from the first node to the second node comprises:
   identifying a plurality of paths to the second node from the first node within the network community;
   determining a path score for each of the identified plurality of paths to the second node from the first node within the network community; and determining a sum of the determined path scores.

3. The method of claim 1, wherein the connectivity statistics comprise at least one of: a mean of the plurality of the connectivity values or a standard deviation of the plurality of the determined connectivity values.

4. The method of claim 3, wherein determining the network connectivity comprises comparing the determined connectivity value from the first node to the second node and the mean of the plurality of the determined connectivity values.

5. The method of claim 1, wherein determining the network connectivity comprises:
generating a normal distribution using a plurality of the determined connectivity values;
determining an area under the normal distribution from zero to the determined connectivity value from the first node to the second node.

6. The method of claim 1, wherein each path comprises at least one link, and wherein the node sample comprises one of the following: every node in the network community connected to the first node by a path having less than a predetermined number of links, a random selection of nodes from the network community, a predetermined number of nodes selected through a random traversal of the network community starting from the first node, or a combination of any of the above.

7. The method of claim 1, wherein the information identifying the paths from the first node to each of the nodes of the node sample comprises information identifying the paths comprising a least number of links from the first node to each of the nodes of the node sample.

8. A system for determining network connectivity between a first node and a second node, the system comprising:
processing circuitry configured to:
access a database comprising information regarding a plurality of nodes and a plurality of paths of a network community, the plurality of nodes including the first node and the second node;
identify a node sample comprising a subset of the plurality of nodes, each of the nodes of the node sample connected to the first node by at least one path;
retrieve from the database, information identifying paths from the first node to each of the nodes of the node sample;
determine a plurality of connectivity values, wherein the plurality of connectivity values comprise connectivity values from the first node to each of the nodes of the node sample;
determine connectivity statistics based on a plurality of the determined connectivity values;
store a determined connectivity value for a first path, of the paths, from the first node to the second node; and
permitting an occurrence of a transaction based on the stored determined connectivity value for the first path between the first node and the second node.

9. The system of claim 8, wherein the processing circuitry is configured to determine the connectivity value from the first node to the second node by:
identifying a plurality of paths to the second node from the first node within the network community;
determining a path score for each of the plurality of paths from to the second node from the first node within the network community; and
determining a sum of the determined path scores.

10. The system of claim 8, wherein the connectivity statistics comprises at least one of: a mean of the plurality of the determined connectivity values or a standard deviation of the plurality of the determined connectivity values.

11. The system of claim 10, wherein the processing circuitry is configured to determine the network connectivity by comparing the determined connectivity value from the first node to the second node and the mean of the plurality of the determined connectivity values from the first node to each of the nodes of the node sample.

12. The system of claim 8, wherein the processing circuitry is configured to determine the network connectivity by:
generating a normal distribution using a plurality of the determined connectivity values; and
determining an area under the normal distribution from zero to the determined connectivity value from the first node to the second node.

13. The system of claim 8, wherein each path comprises at least one link and wherein the node sample comprises one of the following: every node in the network community connected to the first node by a path having less than a predetermined number of links, a random selection of nodes from the network community, a predetermined number of nodes selected through a random traversal of the network community starting from the first node, or a combination of any of the above.

14. The system of claim 8, wherein the information identifying the paths from the first node to each of the nodes of the node sample comprises information identifying paths comprising a least number of links from the first node to each of the nodes of the node sample.

15. A method for determining network connectivity between a first node and a second node, the method comprising:
receiving, at a user device, a user request for the network connectivity value between a first node and a second node;
transmitting an indication of the user request to a remote server, wherein the remote server is configured to:
access a database comprising information regarding a plurality of nodes and a plurality of paths of a network community, the plurality of nodes including the first node and the second node;
identify a node sample comprising a subset of the plurality of nodes, each of the nodes of the node sample connected to the first node by at least one path;
retrieve from the database, information identifying paths from the first node to each of the nodes of the node sample;
determine a plurality of connectivity values, wherein the plurality of connectivity values comprise connectivity values from the first node to each of the nodes of the node sample;
determine connectivity statistics based on a plurality of the determined connectivity values;
determine a connectivity value from the first node to the second node;
update a network connectivity value stored at the remote server, resulting in an updated network connectivity value, in response to determining the network connectivity value between the first node and the second node based on the determined connectivity statistics and the determined connectivity value from the first node to the second node; and
transmit an indication of the determined network connectivity, based on the updated network connectivity value stored at the remote server, between the first node and the second node to the user device;

receiving from the remote server at the user device, the indication of the determined network connectivity between the first node and the second node; and in response to generating for display on the user device the indication of the determined network connectivity between the first node and the second node, receiving a user indication via the user device corresponding to initiating a transaction based on the determined network connectivity between the first and second nodes.

16. The method of claim 15, wherein the remote server is configured to determine the connectivity value from the first node to the second node by:

identifying a plurality of paths to the second node from the first node within the network community;

determining a path score for each of the plurality of paths from to the second node from the first node within the network community; and determining a sum of the determined path scores.

17. The method of claim 15, wherein the connectivity statistics comprises at least one of: a mean of the plurality of the determined connectivity values or a standard deviation of the plurality of the determined connectivity values.

18. The method of claim 17, wherein the remote server is configured to determine the network connectivity by comparing the determined connectivity value from the first node to the second node and the mean of the plurality of the determined connectivity values from the first node to each of the nodes of the node sample.

19. The method of claim 15, wherein the remote server is configured to determine the network connectivity by:

generating a normal distribution using a plurality of the determined connectivity values; and determining an area under the normal distribution from zero to the determined connectivity value from the first node to the second node.

20. The method of claim 15, wherein:

each path comprises at least one link; and the node sample comprises one of the following: every node in the network community connected to the first node by a path having less than a predetermined number of links, a random selection of nodes from the network community, a predetermined number of nodes selected through a random traversal of the network community starting from the first node, or a combination of any of the above.

\* \* \* \* \*